United States Patent
Uchiyashiki et al.

(10) Patent No.: US 10,957,909 B2
(45) Date of Patent: Mar. 23, 2021

(54) COMPOSITION FOR BINDER FOR NON-AQUEOUS CELL ELECTRODE, BINDER FOR NON-AQUEOUS CELL ELECTRODE, COMPOSITION FOR NON-AQUEOUS CELL ELECTRODE, NON-AQUEOUS CELL ELECTRODE, AND NON-AQUEOUS CELL

(71) Applicant: SHOWA DENKO K.K., Tokyo (JP)

(72) Inventors: Junya Uchiyashiki, Himeji (JP); Mitsuru Hanasaki, Himeji (JP); Tomonori Kurata, Tatsuno (JP)

(73) Assignee: SHOWA DENKO K.K., Tokyo (JP)

( * ) Notice: Subject to any disclaimer, the term of this patent is extended or adjusted under 35 U.S.C. 154(b) by 332 days.

(21) Appl. No.: 15/569,502

(22) PCT Filed: Jun. 1, 2016

(86) PCT No.: PCT/JP2016/066295
§ 371 (c)(1),
(2) Date: Oct. 26, 2017

(87) PCT Pub. No.: WO2016/199653
PCT Pub. Date: Dec. 15, 2016

(65) Prior Publication Data
US 2018/0301704 A1 Oct. 18, 2018

(30) Foreign Application Priority Data
Jun. 12, 2015 (JP) ................. 2015-119457

(51) Int. Cl.
| | |
|---|---|
| *H01M 4/62* | (2006.01) |
| *C08F 20/26* | (2006.01) |
| *H01M 10/0525* | (2010.01) |
| *C07F 9/09* | (2006.01) |
| *C07F 9/11* | (2006.01) |

(52) U.S. Cl.
CPC ............ *H01M 4/622* (2013.01); *C07F 9/091* (2013.01); *C07F 9/11* (2013.01); *C08F 20/26* (2013.01); *H01M 10/0525* (2013.01)

(58) Field of Classification Search
None
See application file for complete search history.

(56) References Cited

U.S. PATENT DOCUMENTS

| | | | | |
|---|---|---|---|---|
| 2010/0107619 A1* | 5/2010 | Roskey | .................... | F03D 3/06 60/324 |
| 2012/0171571 A1 | 7/2012 | Kurakane et al. | | |
| 2013/0236777 A1* | 9/2013 | Taki | .................. | H01M 10/0567 429/200 |
| 2013/0309564 A1 | 11/2013 | Yoshida et al. | | |
| 2013/0323605 A1* | 12/2013 | Yamamoto | ........ | H01M 10/0525 429/332 |
| 2014/0154562 A1* | 6/2014 | Fukuchi | ................ | H01M 4/386 429/211 |
| 2014/0363735 A1 | 12/2014 | Yoshida et al. | | |
| 2015/0079467 A1 | 3/2015 | Ahn et al. | | |
| 2015/0225596 A1* | 8/2015 | Kitagawa | ............... | B05D 7/572 524/507 |
| 2015/0284585 A1* | 10/2015 | Onishi | ..................... | C09D 7/40 428/412 |
| 2018/0019499 A1 | 1/2018 | Yoshida et al. | | |
| 2018/0056691 A1* | 3/2018 | Arai | ..................... | C09D 11/322 |

FOREIGN PATENT DOCUMENTS

| | | |
|---|---|---|
| CN | 102804456 A | 11/2012 |
| CN | 103339783 A | 10/2013 |
| CN | 103608962 A | 2/2014 |
| JP | 08-250123 A | 9/1996 |
| JP | 10-298386 A | 11/1998 |
| JP | 2011-243464 A | 12/2011 |
| JP | 2012-216518 A | 11/2012 |
| JP | 2013-012357 A | 1/2013 |
| JP | 2013-033657 A | 2/2013 |
| JP | 2013-168323 A | 8/2013 |
| JP | 2016-031837 A | 3/2016 |
| WO | 2015/133492 A1 | 9/2015 |

OTHER PUBLICATIONS

Communication dated Mar. 10, 2020, from the State Intellectual Property Office of the P.R. of China in Application No. 201680026670.8.
International Search Report of PCT/JP2016/066295 dated Aug. 9, 2016.
English translation of paragraphs [0043]-[0048], [0050], [0053]-[0059], [0146]-0148], [0151]-[0153], [0165]-[0172] of JP 2015-033657.
English translation of Tables 1 to 21 of JP 2015-033657.
Machine Translation of JP 2015-033657.

\* cited by examiner

*Primary Examiner* — Joseph D Anthony
(74) *Attorney, Agent, or Firm* — Sughrue Mion, PLLC

(57) ABSTRACT

A binder composition for nonaqueous battery electrodes essentially contains (A) an ethylenically unsaturated monomer and (B) a surfactant, and further satisfies any two or more conditions of the following (I) to (III): (I) (A) the ethylenically unsaturated monomer includes (a) a phosphoric acid group-containing ethylenically unsaturated monomer; (II) (B) the surfactant comprises (b) a phosphoric acid group-containing surfactant; and (III) the composition including (C) a neutralizing agent containing an alkali metal compound and/or an alkali earth metal compound.

13 Claims, No Drawings

COMPOSITION FOR BINDER FOR NON-AQUEOUS CELL ELECTRODE, BINDER FOR NON-AQUEOUS CELL ELECTRODE, COMPOSITION FOR NON-AQUEOUS CELL ELECTRODE, NON-AQUEOUS CELL ELECTRODE, AND NON-AQUEOUS CELL

CROSS REFERENCE TO RELATED APPLICATIONS

This application is a National Stage of International Application No. PCT/JP2016/066295 filed Jun. 1, 2016, claiming priority based on Japanese Patent Application No. 2015-119457 filed Jun. 12, 2015, the contents of all of which are incorporated herein by reference in their entirety.

TECHNICAL FIELD

The present invention relates to a binder composition for nonaqueous battery electrodes used for forming an electrode of a nonaqueous battery, a binder for nonaqueous battery electrodes obtained by emulsion polymerizing the binder composition for nonaqueous battery electrodes, a composition for nonaqueous battery electrodes comprising the binder for nonaqueous battery electrodes and also an electrode active material, a nonaqueous battery electrode formed by using the composition for nonaqueous battery electrodes, and an nonaqueous battery obtained by using the nonaqueous battery electrode.

BACKGROUND ART

Typical examples of nonaqueous batteries include lithium ion secondary batteries. The nonaqueous batteries are used, in terms of reduction in size and weight of power sources, as power sources for notebook personal computers, mobile telephones, electric power tools, and electronic communications equipment. Recently, they have also used, from the point of view of their applicability to environmental vehicles, for electric vehicles and hybrid electric vehicles. Under such circumstances, higher output, higher capacity, and longer life of the nonaqueous batteries is strongly desired.

The nonaqueous battery is a secondary battery comprising a positive electrode using a metal oxide or the like as an active material, a negative electrode using a carbon material such as graphite as an active material, and an electrolyte solvent with a carbonate or a flame-retardant ionic liquid as a main ingredient, in which charge and discharge of the battery is performed by the movement of ions between the positive electrode and the negative electrode. Particularly, the positive electrode is obtained by coating the surface of a positive electrode collector such as aluminum foil with a slurry comprising a metal oxide and a binder, drying the coating, and then cutting the coated positive electrode collector to a suitable size. The negative electrode is obtained by coating the surface of a negative electrode collector such as copper foil with a slurry comprising a carbon material and a binder, drying the coating, and then cutting the coated negative electrode collector to a suitable size. Therefore, each binder has a role of binding active materials to each other and binding an active material to a collector to prevent peeling of active materials from a collector.

As the binder, a polyvinylidene fluoride (PVDF)-based binder using N-methyl-2-pyrrolidone (NMP) of an organic solvent system as a solvent is well known (PTL 1). However, this binder has a low binding property between active materials and between an active material and a collector, and a large amount of binder is required for practical use. As a result, the capacity of the resulting nonaqueous battery is reduced, which is a defect. In addition, since an expensive organic solvent NMP is used for binders, there is a problem also in the price of end products and the preservation of work environment during the production of a slurry or a collector.

As a method for solving these problems, the development of a water-dispersed binder has been advanced. For example, there is known a styrene-butadiene rubber (SBR)-based aqueous dispersion in which carboxymethyl cellulose (CMC) is used in combination as a thickener (PTL 2). Since this SBR-based dispersion is an aqueous dispersion, it is inexpensive and advantageous from the point of view of the preservation of work environment. Further, since the binding property between active materials and between an active material and a collector is relatively satisfactory, electrodes can be produced by using a smaller amount of the SBR-based dispersion than the amount of the PVDF-based binder. As a result, there is an advantage that higher output and higher capacity of nonaqueous batteries can be achieved. From these advantages, the SBR-based dispersion is widely used as a binder for nonaqueous battery electrodes.

However, also in this binder, the binding property between active materials and between an active material and a collector is not necessarily sufficient, and when an electrode is produced with a small amount of binder, a part of an active material is peeled off in the step of cutting a collector, which is problematic. Further, the SBR-based binder has low elution resistance and swelling resistance to a nonaqueous solvent used for electrolytes and thus has a problem that longer life cannot be achieved for a nonaqueous battery obtained by using the binder.

Under such a background, PTL 3 proposes a method involving using a non-diene-based polymer essentially comprising of styrene and an ethylenically unsaturated carboxylic acid ester as a water-dispersed binder instead of conventional SBR. It is disclosed that when this binder is used, the binding property between active materials and between an active material and a collector is satisfactory, and that a charge-discharge cycle property is improved. However, there is still room for improvement in the electrolyte resistance and charge-discharge cycle property.

Further, PTLs 4 to 6 proposes that an acidic group-containing ethylenically unsaturated monomer is polymerized and used as a binder for secondary battery electrodes. They mention, as the acidic group-containing ethylenically unsaturated monomer, a carboxylic group-containing ethylenically unsaturated monomer, a sulfuric acid containing ethylenically unsaturated monomer and a phosphoric acid group-containing ethylenically unsaturated monomer. However, there is still room for improvement in the charge-discharge cycle property.

CITATION LIST

Patent Literature

PTL 1: JP 10-298386 A
PTL 2: JP 08-250123 A
PTL 3: JP 2011-243464 A
PTL 4: JP 2013-168323 A
PTL 5: JP 2012-216518 A
PTL 6: JP 2013-012357 A

SUMMARY OF INVENTION

Technical Problem

An object of the present invention is to solve prior art problems as described above and to provide a binder composition for nonaqueous battery electrodes which provides the battery prepared therefrom with an excellent charge-discharge cycle property based on its excellent elution resistance and swelling resistance to a nonaqueous solvent in a water dispersion. In addition, another object of the present invention is to provide a binder for nonaqueous battery electrodes, a nonaqueous battery electrode and a nonaqueous battery by using the binder composition for nonaqueous battery electrodes.

Solution to Problem

[1] A binder composition for nonaqueous battery electrodes, the composition essentially comprising (A) an ethylenically unsaturated monomer and (B) a surfactant and further satisfying any two or more conditions of the following (I) to (III):

(I) (A) the ethylenically unsaturated monomer comprises (a) a phosphoric acid group-containing ethylenically unsaturated monomer;

(II) (B) the surfactant comprises (b) a phosphoric acid group-containing surfactant; and (III) the composition comprises (C) at least one neutralizing agent selected from the group consisting of an alkali metal compound and an alkali earth metal compound.

[2] The binder composition for nonaqueous battery electrodes according to [1], wherein the total amount in the composition of phosphorus atoms derived from (a) the phosphoric acid group-containing ethylenically unsaturated monomer and (b) the phosphoric acid group-containing surfactant is from 0.01 to 3.0 parts by mass based on 100 parts by mass of the total amount of (A) the ethylenically unsaturated monomer and (B) the surfactant.

[3] The binder composition for nonaqueous battery electrodes according to [1] or [2], wherein the composition satisfies the conditions of the above (I) and (III).

[4] The binder composition for nonaqueous battery electrodes according to [1] or [2], wherein the composition satisfies the conditions of the above (II) and (III).

[5] The binder composition for nonaqueous battery electrodes according to [1] or [2], wherein the composition satisfies the conditions of the above (I) and (II).

[6] The binder composition for nonaqueous battery electrodes according to [1] or [2], wherein the composition satisfies all conditions of the above (I), (II) and (III).

[7] The binder composition for nonaqueous battery electrodes according to any of [1] to [3], [5] and [6], wherein (a) the phosphoric acid group-containing ethylenically unsaturated monomer at least comprises a compound represented by the following general formula (1) or (2):

[Formula 1]

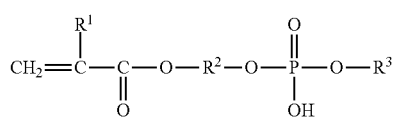
(1)

wherein $R^1$ represents a hydrogen atom or a methyl group; $R^2$ represents a divalent aliphatic hydrocarbon group having from 1 to 30 carbon atoms which may have a halogen group or an ether group; and $R^3$ represents a hydrogen atom or an aliphatic hydrocarbon group having from 1 to 10 carbon atoms or an aromatic hydrocarbon group; or $R^3$ represents a cation selected from the group consisting of ammonium, sodium, lithium, potassium and alcohol amino half salt; or

[Formula 2]

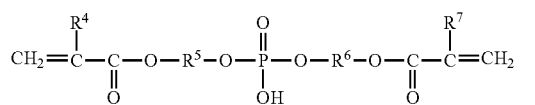
(2)

wherein $R^4$ and $R^7$ each independently represent a hydrogen atom or a methyl group; and $R^5$ and $R^6$ each independently represent a divalent aliphatic hydrocarbon group having from 1 to 30 carbon atoms.

[8] The binder composition for nonaqueous battery electrodes according to any of [1] to [3], and [5] to [7], wherein the amount of (a) the phosphoric acid group-containing ethylenically unsaturated monomer is from 0.03 to 15 mol % based on the total amount of (A) the ethylenically unsaturated monomer in the binder composition for nonaqueous battery electrodes.

[9] The binder composition for nonaqueous battery electrodes according to any of [1], [2], and [4] to [8], wherein (b) the phosphoric acid group-containing surfactant at least comprises a compound represented by the following general formula (3):

[Formula 3]

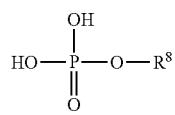
(3)

wherein $R^8$ represents an aliphatic hydrocarbon group having 6 to 18 carbon atoms or a group represented by the following formula (4):

[Formula 4]

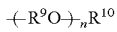
(4)

wherein $R^9$ represents a divalent aliphatic hydrocarbon group having 2 or 3 carbon atoms; $R^{10}$ represents an aliphatic hydrocarbon group having 6 to 18 carbon atoms or a group represented by the following formula (5); and n is an integer of from 1 to 10:

[Formula 5]

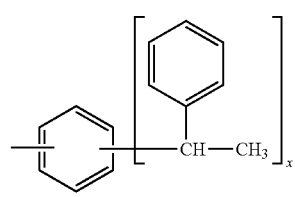
(5)

wherein x is an integer of from 1 to 5.

[10] The binder composition for nonaqueous battery electrodes according to any of [1] to [3], and [5] to [9], wherein the amount of (b) the phosphoric acid group-containing surfactant is from 1.0 to 60% by mass based on the total amount of (B) the surfactant in the binder composition for nonaqueous battery electrodes.

[11] The binder composition for nonaqueous battery electrodes according to any of [1] to [4], and [6] to [10], wherein the amount of (C) the alkali metal salt and/or the alkali earth metal salt is from 0.1 to 5 parts by mass based on 100 parts by mass of the total amount of the ethylenically unsaturated monomer in the binder composition for nonaqueous battery electrodes.

[12] A binder for nonaqueous battery electrodes obtained by emulsion polymerizing the binder composition for nonaqueous battery electrodes according to any of [1] to [11].

[13] A composition for nonaqueous battery electrodes comprising the binder for nonaqueous battery electrodes according to [12] and also an electrode active material.

[14] An nonaqueous battery electrode formed by using the composition for nonaqueous battery electrodes according to [13].

[15] A nonaqueous battery comprising the nonaqueous battery electrode according to [14].

Advantageous Effects of Invention

The present invention can provide a binder composition for nonaqueous battery electrodes which provide the battery prepared therefrom with an excellent charge-discharge cycle property based on its excellent elution resistance and swelling resistance to a nonaqueous solvent in a water dispersion. In addition, another object of the present invention can be providing a nonaqueous battery electrode formed by using a slurry using the binder composition for nonaqueous battery electrodes.

DESCRIPTION OF EMBODIMENTS

When the following binder composition for nonaqueous battery electrodes is used, an electrode having a good cycle property can be obtained.

<Binder Composition for Nonaqueous Battery Electrodes>

The binder composition for nonaqueous battery electrodes essentially comprises (A) an ethylenically unsaturated monomer and (B) a surfactant and further satisfies any two or more conditions of the following (I) to (III):

(I) (A) the ethylenically unsaturated monomer comprises (a) a phosphoric acid group-containing ethylenically unsaturated monomer;

(II) (B) the surfactant comprises (b) a phosphoric acid group-containing surfactant; and (III) the composition comprises (C) a neutralizing agent comprising an alkali metal compound and/or an alkali earth metal compound.

The binder composition for nonaqueous battery electrodes (hereinafter also referred to "binder composition") contains phosphorus atoms derived from (a) the phosphoric acid group-containing ethylenically unsaturated monomer and (b) the phosphoric acid group-containing surfactant in the total amount of from 0.01 to 3.0 parts by mass based on 100 parts by mass of the total amount of (A) the ethylenically unsaturated monomer and (B) the surfactant. The amount of phosphorus atoms is preferably from 0.02 to 0.8 parts by mass, and more preferably from 0.40 to 0.75 parts by mass.

When the binder composition satisfies the condition of above (III) and satisfies any one condition of the above (I) or (II), the amount in the composition of phosphorus atoms derived from any one of (a) the phosphoric acid group-containing ethylenically unsaturated monomer and (b) the phosphoric acid group-containing surfactant is from 0.01 to 3.0 parts by mass based on 100 parts by mass of the total amount of (A) the ethylenically unsaturated monomer and (B) the surfactant. The amount of phosphorus atoms is preferably from 0.02 to 0.8 parts by mass, and more preferably from 0.40 to 0.75 parts by mass.

In addition, from the point of view of a charge-discharge cycle property of secondary batteries, the binder composition for nonaqueous battery electrodes preferably satisfies the conditions of the above (I) and (III).

In addition, from the point of view of a charge-discharge cycle property of secondary batteries, the binder composition for nonaqueous battery electrodes preferably satisfies the conditions of the above (II) and (III).

In addition, from the point of view of a charge-discharge cycle property of secondary batteries, the binder composition for nonaqueous battery electrodes preferably satisfies the conditions of the above (I) and (II).

Furthermore, the binder composition for nonaqueous battery electrodes preferably satisfies all conditions of the above (I), (II) and (III).

<(A) Ethylenically Unsaturated Monomer>

The above-mentioned (A) ethylenically unsaturated monomer comprises at least one of (a) a phosphoric acid group-containing ethylenically unsaturated monomer and an ethylenically unsaturated monomer which does not correspond to (a) the phosphoric acid group-containing ethylenically unsaturated monomer.

However, when the binder composition does not satisfy the condition of the above (II), (A) the ethylenically unsaturated monomer must comprise (a) the phosphoric acid group-containing ethylenically unsaturated monomer.

Further, when the binder composition satisfies the conditions of the above (I) and (III), (A) the ethylenically unsaturated monomer must also comprise (a) the phosphoric acid group-containing ethylenically unsaturated monomer.

Inclusion of phosphoric atoms in the binder composition for nonaqueous battery electrodes improves the cycle property of the battery prepared therefrom and improves the life property of the battery prepared therefrom during the charge and discharge cycle.

((a) Phosphoric Acid Group-Containing Ethylenically Unsaturated Monomer)

The ethylenically unsaturated monomer (A) preferably comprises (a) a phosphoric acid group-containing ethylenically unsaturated monomer. The phosphoric acid group-containing ethylenically unsaturated monomer (a) is a monomer containing an ethylenically unsaturated group and a phosphoric acid group in its molecule, and preferably a compound represented by the following general formula (1) or (2):

[Formula 6]

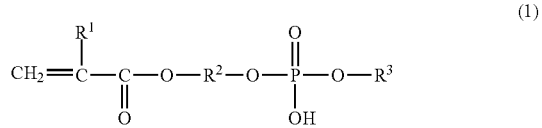

(1)

wherein $R^1$ represents a hydrogen atom or a methyl group; $R^2$ represents a divalent aliphatic hydrocarbon group having from 1 to 30 carbon atoms which may have a halogen group or an ether group; and $R^3$ represents a hydrogen atom or an aliphatic hydrocarbon group having from 1 to 10 carbon atoms or an aromatic hydrocarbon group; or $R^3$ represents a cation selected from the group consisting of ammonium, sodium, lithium, potassium and alcohol amino half salt; or

[Formula 7]

(2)

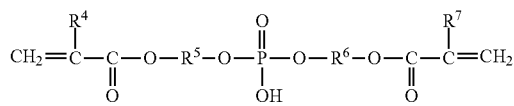

wherein $R^4$ and $R^7$ each independently represent a hydrogen atom or a methyl group; and $R^5$ and $R^6$ each independently represent a divalent aliphatic hydrocarbon group having from 1 to 30 carbon atoms.

The phosphoric acid group-containing ethylenically unsaturated monomer (a) is preferably from 0.03 to 15.0 mol %, more preferably from 0.3 to 8.0 mol %, and still more preferably from 0.5 to 4.0 mol % based on the total amount of (A) the ethylenically unsaturated monomer in the binder composition for nonaqueous battery electrodes. When the amount of (a) the phosphoric acid group-containing ethylenically unsaturated monomer used is 0.03 mol % or more, the cycle property of the electrode prepared from the binder composition is improved, while when the amount used is 15.0 mol % or less, the adhesion to active materials is good and the life property of the battery prepared therefrom during the charge and discharge cycle is thus good.

Examples of (a) the phosphoric acid group-containing ethylenically unsaturated monomer include 2-methacryloyloxyethyl acid phosphate, bis(2-hydroxyethyl methacrylate) phosphate, acid phosphooxypolyoxyethylene glycol monomethacrylate, acid phosphooxypolyoxypropylene glycol monomethacrylate, 3-chloro-2-acid phosphooxypropyl methacrylate, and methacroyloxyethyl acid phosphate monoethanolamine half salt. Particularly preferred are 2-methacryloyloxyethyl acid phosphate, bis(2-hydroxyethyl methacrylate) phosphate and acid phosphooxypolyoxyethylene glycol monomethacrylate.

(Ethylenically Unsaturated Monomer which does not Correspond to (a) Phosphoric Acid Group-Containing Ethylenically Unsaturated Monomer)

The binder composition preferably contains (a) a phosphoric acid group-containing ethylenically unsaturated monomer as well as an ethylenically unsaturated monomer (A) which does not correspond to (a) the phosphoric acid group-containing ethylenically unsaturated monomer. Examples of the ethylenically unsaturated monomer which does not correspond to (a) the phosphoric acid group-containing ethylenically unsaturated monomer include styrene, acrylic acid, methacrylic acid, crotonic acid, maleic acid, fumaric acid, itaconic acid, alkyl (meth) acrylate such as 2-ethylhexyl acrylate (2-EHA), 2-hydroxyethyl methacrylate (2-HEMA) and tert-butyl (meth) acrylate (TBMA), sodium p-toluenesulfonate, vinylpyrrolidone, vinylacetamide, N-alkyl(meth)acrylamide, N, N-dialkyl(meth)acrylamide, N-hydroxyalkyl(meth)acrylamide with the alkyl group having from 1 to 3 carbon atoms, diacetone (meth) acrylamide, and dimethylaminoalkyl(meth)acrylamide with the alkyl group other than the alkyl group of the dimethylamino group having from 1 to 5 carbon atoms, and (meth) acrylamide-2-methylpropanesulfonic acid. From the viewpoint of availability, styrene, acrylic acid, methacrylic acid, itaconic acid, and alkyl (meth) acrylate such as 2-ethylhexyl acrylate (2-EHA) and 2-hydroxyethyl methacrylate (2-HEMA) are preferred among them. The amount of the ethylenically unsaturated monomer which does not correspond to (a) the phosphoric acid group-containing ethylenically unsaturated monomer is preferably 20% by mass or less and more preferably 10% by mass or less based on the solid content of the synthetic resin emulsion, and the amount thereof in the component (A) is preferably from 85 to 100 mol %, more preferably from 92.0 to 99.7 mol %, still more preferably from 85 to 99.07 mol %, and particularly preferably from 96.0 to 99.5 mol %.

However, if the binder composition contains a conjugated diene such as butadiene or isoprene as a polymerizable monomer, an adequate cycle property cannot be obtained when the amount of the binder used is reduced. Therefore, the binder composition preferably contains 1% or less of the conjugated diene as a polymerizable monomer.

Further, the ethylenically unsaturated monomer (A) subjected to emulsion polymerization may comprise a molecular weight modifier such as mercaptan, thioglycolic acid and an ester thereof, and β-mercaptopropionic acid and an ester thereof, in order to adjust the molecular weight of the polymer.

The ethylenically unsaturated monomer (A) is preferably 95.0 parts by mass or more and 99.5 parts by mass or less, more preferably 95.5 parts by mass or more and 99.0 parts by mass or less, and still more preferably 96.0 parts by mass or more and 98.5 parts by mass or less based on 100 parts by mass of the solid content of the synthetic resin emulsion.

As the binder composition for nonaqueous battery electrodes essentially comprises (A) an ethylenically unsaturated monomer and (B) a surfactant and further satisfies any two or more conditions of the above (I) to (III), as described above, "solid content of a synthetic resin emulsion" refers to "solid content of (A) an ethylenically unsaturated monomer and (B) a surfactant" or "solid content of (A) an ethylenically unsaturated monomer, (B) a surfactant and (C) a neutralizing agent comprising an alkali metal compound and/or an alkali earth metal compound", depending on the condition.

When preparing a resin from the binder composition of the present invention, the binder composition may be preferably emulsion polymerized in an aqueous medium. The emulsion polymerization is suitably performed in an aqueous medium using a radical polymerization initiator. Examples of the emulsion polymerization process include a process in which all of the components used for the emulsion polymerization are charged at once and are subjected to emulsion polymerization and a process in which each component used for the emulsion polymerization is continuously fed while subjecting to emulsion polymerization. Among these processes, the process in which each component used for emulsion polymerization is continuously fed while subjecting to emulsion polymerization is preferred, because it produces fine binder particles having a uniform particle size and efficiently removes heat during reaction. The emulsion polymerization is generally performed at a temperature of from 30 to 90° C. with stirring.

<(B) Surfactant>

Examples of the surfactant (B) used for the binder composition of the present application include an anionic surfactant, a cationic surfactant and a nonionic surfactant, but an anionic surfactant and a nonionic surfactant are preferred. Examples of the anionic surfactant include an alkylbenzenesulfonic acid salt, an alkylsulfuric ester salt, polyoxyethylene alkyl ether sulfuric ester salt, and a fatty acid salt. Examples of the nonionic surfactant include polyoxyethylene alkyl ether, polyoxyethylene alkyl phenyl ether, polyoxyethylene polycyclic phenyl ether, polyoxyalkylene alkyl ether, sorbitan fatty acid ester, and polyoxyethylene sorbitan fatty acid ester.

The surfactant (B) preferably comprises (b) a phosphoric acid group-containing surfactant.

The phosphoric acid group-containing surfactant (b) preferably at least contains a compound represented by the following general formula (3):

[Formula 8]

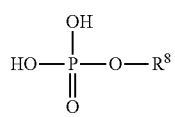

(3)

wherein $R^8$ represents an aliphatic hydrocarbon group having from 6 to 18 carbon atoms or a group represented by the following formula (4):

[Formula 9]

(4)

wherein $R^9$ represents a divalent aliphatic hydrocarbon group having from 2 or 3 carbon atoms; $R^{10}$ represents an aliphatic hydrocarbon group having from 6 to 18 carbon atoms or a group represented by the following formula (5); and n is an integer of from 1 to 10:

[Formula 10]

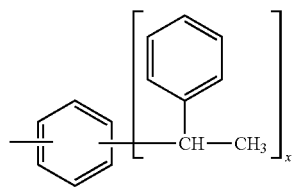

(5)

wherein x is an integer of from 1 to 5.

Further, it is more preferred to use the combination of two or more surfactants of (b) the phosphoric acid group-containing surfactant and (B) a surfactant which does not correspond to (b) the phosphoric acid group-containing surfactant. Among the surfactants, (b) the phosphoric acid group-containing surfactant is a surfactant having a phosphoric acid group in the molecule. Examples of (b) the phosphoric acid group-containing surfactant include lauryl phosphate, polyoxyethylene lauryl ether phosphate ester, (C12-15)pareth-6 phosphate (diester or half ester or a mixtures thereof), polyoxyethylene tridecyl ether phosphate ester, polyoxyethylene octyl ether phosphate ester, polyoxyethylene styrenated phenyl ether phosphate ester, and polyoxypropylene allyl ether phosphate ester. Among them, lauryl phosphate, polyoxyethylene lauryl ether phosphate ester, polyoxyethylene styrenated phenyl ether phosphate ester are preferred. As used herein, styrenated phenyl refers to a phenyl group with one or more styrene molecules added as described below, and the structure of the styrenated phenyl with an oxygen atom removed corresponds to the moiety of $R^{10}$ in the above chemical formula (5):

[Formula 11]

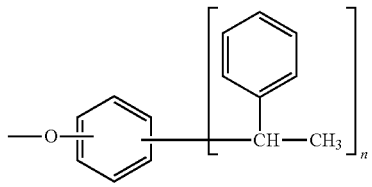

wherein n is an integer of from 1 to 5.

The amount of (b) phosphoric acid group-containing surfactant comprised in (B) the surfactant in the binder composition for nonaqueous battery electrodes is preferably from 1.0 to 60.0% by mass, more preferably from 5.0 to 55.0% by mass, and still more preferably from 10 to 50.0% by mass. When the amount of the surfactant used is 1.0% by mass or more, the cycle property of the battery is improved. When the amount of the surfactant used is 60.0% by mass or less, the emulsion polymerization stability and mechanical stability is improved. Even if the surfactant has an ethylenically unsaturated bond, it is not included in the ethylenically unsaturated monomer in the present invention.

The amount of (b) the phosphoric acid group-containing surfactant used is preferably from 0.1 to 2 parts by mass based on (A) the ethylenically unsaturated monomer. When the amount of the surfactant used is 0.1 parts by mass or more, the cycle property of the battery is improved. When the amount of the surfactant used is 2 parts by mass or less, the emulsion polymerization stability and mechanical stability is improved. Again, even if the surfactant has an ethylenically unsaturated bond, it is not included in the ethylenically unsaturated monomer in the present invention.

The surfactant may be used alone or in combination of two or more. The surfactant having no phosphoric acid group (B) is not particularly limited. However, when the surfactant represented by the following general formulas (6) to (9) is used, the stability of particles is improved.

General Formula (6)

[Formula 12]

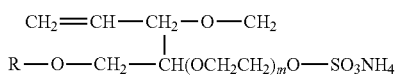

wherein R represents an alkyl group, and m represents an integer of from 10 to 40.

General Formula (7)

[Formula 13]

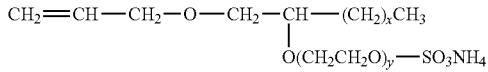

wherein x represents an integer of from 10 to 12, and y represents an integer of from 10 to 40.

General Formula (8)

[Formula 14]

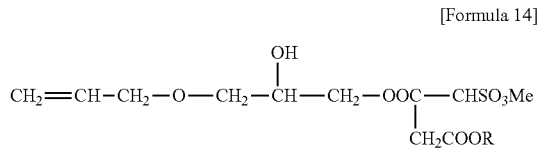

wherein R represents an alkyl group, and M represents $NH_4$ or Na.

General Formula (9)

[Formula 15]

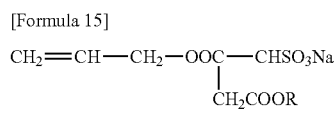

wherein R represents an alkyl group.

The total amount of (B) the surfactant used is preferably from 0.1 to 3 parts by mass based on 100 parts by mass of the total amount of (A) the ethylenically unsaturated monomer. When the amount of the surfactant used is 0.1 parts by mass or more, emulsion polymerization can be easily performed and the mechanical stability of the resulting binder is raised. Further, the amount of the surfactant used is preferably 0.1 parts by mass or more, because the size of particles contained in a water-dispersed emulsion which is the binder obtained by emulsion polymerization is small and the particles are thereby resistant to setting. When the amount of the surfactant used is 3 parts by mass or less, the adhesion between an active material and a collector tends to be improved. Again, even if the surfactant has an ethylenically unsaturated bond and is for example that shown in any one of the above formulas (6) to (9), (5) to (8), it is not included in (A) the ethylenically unsaturated monomer in the present invention.

<(C) Neutralizing Agent Comprising at Least One of Alkali Metal Compound and Alkali Earth Metal Compound>

Examples of (C) the neutralizing agent comprising at least one of an alkali metal compound and an alkali earth metal compound (hereinafter also referred to "(C) neutralizing agent") include lithium hydroxide, potassium hydroxide, sodium hydroxide, magnesium hydroxide and calcium hydroxide. Potassium hydroxide or sodium hydroxide is preferred, and sodium hydroxide is more preferred.

The amount of (C) the neutralizing agent used is suitably from 0.1 to 5 parts by mass, preferably from 0.3 to 4 parts by mass, and more preferably 0.5 to 3 parts by mass, based on 100 parts by mass of the total amount of (A) the ethylenically unsaturated monomer. The amount of (C) the neutralizing agent used of 0.5 parts by mass or more improves emulsion polymerization stability and mechanical stability as well as the binding property between active materials and between an active material and a collector. On the other hand, the amount of (C) the neutralizing agent used of 3 parts by mass or less improves the binding property between active materials and between an active material and a collector.

<Polymerization Initiator>

The radical polymerization initiator used in the emulsion polymerization is not particularly limited, and a known radical polymerization initiator can be used. Examples of the radical polymerization initiator include ammonium persulfate, potassium persulfate, hydrogen peroxide, and t-butyl hydroperoxide. Further, the emulsion polymerization may optionally be redox polymerization in which a radical polymerization initiator is used in combination with a reducing agent such as sodium bisulfite, Rongalite, and ascorbic acid.

In the present invention, water is generally used as an aqueous medium, but a medium obtained by adding a hydrophilic solvent to water may be used as an aqueous medium unless the polymerization stability of the resulting binder is impaired. Examples of the hydrophilic solvent to be added to water include methanol, ethanol, and N-methylpyrrolidone.

<Binder for Nonaqueous Battery Electrodes>

When polymerizing the binder composition for nonaqueous battery electrodes and preparing a binder for nonaqueous battery electrodes (hereinafter also referred to "binder") therefrom, the binder composition is preferably emulsion polymerized in an aqueous medium. Then, the binder is obtained as a binder dispersion having a polymer dispersed in the aqueous medium. The non-volatile matter of the binder dispersion is preferably from 20 to 60% by mass, and more preferably from 30 to 50% by mass. The pH of the binder dispersion is preferably from 1.5 to 10, more preferably from 4 to 9, and still more preferably from 6 to 9. The viscosity of the binder dispersion is preferably from 1 to 5000 mPa·s. The non-volatile matter of the binder dispersion in the present invention is calculated as a residue after weighing out about 1 g of a resin in a plate-like container such as a dish or a plate and drying the resin at 105° C. for 1 hour. The viscosity of the binder dispersion in the present invention is measured by changing the measurement method depending on whether the viscosity is 500 mPa·s or more or less than 500 mPa·s. The measurement method for the viscosity of 500 mPa·s or more is first performed, and if the measurement result is less than 500 mPa·s, the measurement is performed by changing the measurement condition to the condition described below. When the viscosity of the binder dispersion was 500 mPa·s or more, the viscosity was measured using a Brookfield type rotational viscometer with a No. 2 or a No. 3 rotor at a liquid temperature of 23° C. and a number of revolution of 10 rpm. On the other hand, when the viscosity of the binder dispersion was less than 500 mPa·s, the viscosity was measured using a Brookfield type rotational viscometer with a No. 2 rotor at a liquid temperature of 23° C. and a number of revolution of 60 rpm (for example, in the case of Comparative Example 4 and Example 2 as described below).

The glass transition temperature (Tg) of the binder for nonaqueous battery electrodes of the present invention is preferably from −55 to 30° C., more preferably from −25 to 25° C., and particularly preferably from −20 to 10° C. When the Tg of the binder is in the above range, the binding property between active materials of the binder and between an active material and a collector will be developed, and a crack of the electrode obtained using a slurry comprising the binder and an active material can be easily prevented. If the Tg of the binder is less than −55° C., the binding property between active materials and between an active material and a collector will tend to be reduced. Further, if the Tg of the binder is higher than 30° C., a crack will easily occur in the electrode obtained by applying a slurry comprising the binder and an active material. The Tg of the binder can be adjusted by changing the content of styrene included in the ethylenically unsaturated monomers and the type or the amount of the ethylenically unsaturated monomers.

The glass transition temperature of the binder for nonaqueous battery electrodes of the present invention is a theoretical value calculated with good approximation by the following formula (I) from the glass transition temperature Tgi (i=1, 2, . . . , i) of each homopolymer of (A) the ethylenically unsaturated monomer Mi (i=1, 2, . . . , i) to be used in the emulsion polymerization of the polymer for binders and each weight fraction Xi (i=1, 2, . . . , i) of (A) the ethylenically unsaturated monomer Mi.

$$1/Tg = \Sigma(Xi/Tgi) \tag{I}$$

<Composition for Nonaqueous Battery Electrodes>

Next, the composition for nonaqueous battery electrodes will be described in detail. In the present specification, the composition for nonaqueous battery electrodes is sometimes represented by "slurry" or a "slurry composition", but they all mean the same thing. The slurry of the present invention comprises the binder for nonaqueous battery electrodes described above, an active material, and an aqueous medium and optionally a thickener, and is prepared by dispersing or dissolving the binder dispersion, the active material, and the optional thickener in the aqueous medium.

The content of the binder included in the slurry in terms of non-volatile matter of the binder dispersion is preferably from 0.1 to 1.8 parts by mass, more preferably from 0.3 to 1.6 parts by mass, most preferably from 0.5 to 1.5 parts by mass, based on 100 parts by mass of the electrode active material. If the amount used of the non-volatile matter of the binder dispersion is less than 0.1 part by mass, the binding property between an active material and a collector is poor, and the charge-discharge cycle property tends to be reduced; and if the amount used of the non-volatile matter of the binder composition is more than 1.8 parts by mass, the internal resistance of the battery will increase to reduce the initial capacity, and the charge-discharge cycle property tends to be reduced.

The electrode active material may be a material which can dope/dedope lithium or the like. When the slurry for nonaqueous battery electrodes is for forming a negative electrode, examples of the active material include conductive polymers such as polyacetylene and polypyrrole; cokes such as coke, petroleum coke, pitch coke, and coal coke; polymer charcoal; carbon fiber; carbon black such as acetylene black; graphite such as artificial graphite and natural graphite; lithium titanate; and silicon. Among these active materials, it is preferred to use carbon black, graphite, natural graphite, lithium titanate, silicon, and the like from the point that the energy density per volume is high. Among them, when the active material is a carbon material, specifically, cokes such as coke, petroleum coke, pitch coke, and coal coke; polymer charcoal; carbon fiber; carbon black such as acetylene black; and graphite such as artificial graphite and natural graphite, the effect of improving the binding property by the binder of the present invention is remarkable.

When the composition for nonaqueous battery electrodes is for forming a positive electrode, the positive electrode active material is not particularly limited as long as it is a positive electrode active material that can be used for a nonaqueous battery, and lithium cobaltate ($LiCoO_2$); lithium composite oxides containing nickel such as a Ni—Co—Mn-based lithium composite oxide, a Ni—Mn—Al-based lithium composite oxide, and a Ni—Co—Al-based lithium composite oxide; spinel-type lithium manganate ($LiMn_2O_4$); olivine-type iron phosphate lithium; and charcogen compounds such as $TiS_2$, $MnO_2$, $MoO_3$, and $V_2O_5$ are used singly or in combination. Further, metal oxides in which other alkali metals are used can also be used.

The non-volatile matter concentration of the composition for nonaqueous battery electrodes is preferably from 30 to 70% by mass, more preferably from 40 to 60% by mass. Further, the viscosity of the composition for nonaqueous battery electrodes (slurry) is preferably from 500 to 20,000 mPa·s, more preferably from 5,000 to 20,000 mPa·s. When the non-volatile matter and the viscosity of the slurry are in this range, the slurry provides good coatability to a collecting electrode plate and is excellent in the productivity of an electrode. The non-volatile matter concentration of the slurry is adjusted by the amount of an aqueous medium (dispersion medium). Further, the viscosity of the slurry is adjusted by the amount of a dispersion medium and a thickener. Generally, with respect to the dispersion medium, water or a hydrophilic solvent is further added to a dispersion medium derived from a binder dispersion. Examples of the hydrophilic solvent include methanol, ethanol, and N-methylpyrrolidone.

Examples of the thickener include cellulose such as carboxymethyl cellulose, hydroxyethyl cellulose, and hydroxypropyl cellulose, and ammonium and alkali metal salts thereof, poly(meth)acrylic acid and ammonium salts and alkali metal salts thereof, polyvinylacetamide (PNVA), or NVA-sodium acrylate copolymers, polyvinyl alcohol, and polyvinylpyrrolidone. Among these thickeners, carboxymethyl cellulose and poly(meth)acrylic acid, and ammonium salts and alkali metal salts thereof, polyvinylacetamide (PNVA), and NVA-sodium acrylate copolymers are preferably used because a slurry in which an active material is dispersed can be easily produced.

The amount added of the thickener included in the slurry is preferably from 0.5 to 1.5 parts by mass based on 100 parts by mass of an active material. When the slurry comprises the thickener in the above amount, the coatability of the slurry will be improved, and the binding property between active materials and between an active material and a collector in the active material layer prepared by coating and drying the slurry will be further improved.

The method for preparing a slurry is not particularly limited, and any known method can be used. Examples include a method involving mixing a binder dispersion, an active material, an optional thickener, and an aqueous medium (dispersion medium) using a mixer such as a stirring mixer, a rotating mixer and a shaking mixer. From the point of view of the durability of a battery and the like, the pH of the slurry is preferably from 2 to 10, more preferably from 4 to 9, and still more preferably from 6 to 9.

<Electrode for Nonaqueous Batteries>

The electrode (electrode for nonaqueous batteries) of the present invention may be formed using the slurry described above. For example, the electrode can be produced by coating a collector with a slurry, drying the slurry to form an active material layer, and then cutting the coated collector to a suitable size.

Examples of the collector used for the electrode include, but are not particularly limited to, a collector made of metal, such as iron, copper, aluminum, nickel, and stainless steel. Further, the shape of the collector is not particularly limited, and a sheet having a thickness of from 0.001 to 0.5 mm is generally used.

The method of coating a collector with a slurry is not particularly limited, and a common coating method can be used. Examples include a reverse roll method, a direct roll method, a doctor blade method, a knife method, an extrusion method, a curtain method, a gravure method, a bar method, a clip method, and a squeeze method. Among these, it is preferred to use a doctor blade method, a knife method, or an extrusion method, in that it is suitable for various physical properties such as viscosity and drying characteristics of the slurry used for the nonaqueous battery electrode, and in that it enable a coating film having a satisfactory surface state to be obtained.

The slurry may be applied only to one surface of a collector or may be applied to both surfaces thereof. When the slurry is applied to both surfaces of the collector, one surface may be applied before the other surface, or both surfaces may be applied at the same time. Further, the slurry may be continuously applied to the surface of a collector or may be intermittently applied thereto. The thickness, length, and width of a coating film prepared by applying the slurry can be suitably determined depending on the size of a battery and the like.

The method for drying the coating film prepared by applying the slurry to form an active material layer is not particularly limited, and a known method can be used. For example, as a drying method, hot wind, vacuum, (far) infrared rays, electron beams, and low-temperature wind may be used singly or in combination. The temperature for drying the coating film is generally in the range of from 40 to 180° C., and the drying time is generally from 1 to 30 minutes.

The collector in which the active material layer is formed is cut to a size and shape suitable as an electrode. The method for cutting the collector in which the active material layer is formed is not particularly limited, and, for example, a slit, a laser, wire cut, a cutter, a Thomson blade, and the like can be used.

The collector in which the active material layer is formed may be optionally pressed before or after cutting the collector, thereby capable of reducing the peeling of the active material and miniaturizing the nonaqueous battery by the reduction in thickness of the electrode. A common method can be used as a method of pressing, and particularly, a mold press method and a roll press method are preferably used. The pressing pressure is preferably, but not particularly limited to, from 0.5 to 5 t/cm$^2$, which is the range where the pressing does not influence the doping/dedoping of lithium ions or the like into the active material.

A nonaqueous solution having high ion conductivity can be used as the electrolytic solution. Examples of the solution include an organic solvent, an ionic liquid, and acetonitrile in which an electrolyte is dissolved.

<Nonaqueous Battery>

The battery (nonaqueous battery) of the present invention comprises the electrode described above. The battery is prepared by receiving a positive electrode, a negative electrode, an electrolytic solution, and an optionally installed component such as a separator in an outer packaging body, and the electrode of the present invention can be used for one or both of the positive electrode and the negative electrode. Examples of the shape of the electrode include, but are not particularly limited to, a laminate and a wound body.

A known alkali metal salt can be used as the electrolyte, and the electrolyte can be suitably selected depending on the type or the like of the active material. Examples of the electrolyte include $LiClO_4$, $LiBF_6$, $LiPF_6$, $LiCF_3SO_3$, $LiCF_3CO_2$, $LiAsF_6$, $LiSbF_6$, $LiB_{10}Cl_{10}$, $LiAlCl_4$, $LiCl$, $LiBr$, $LiB(C_2H_5)_4$, $CF_3SO_3Li$, $CH_3SO_3Li$, $LiCF_3SO_3$, $LiC_4F_9SO_3$, $Li(CF_3SO_2)_2N$, and a lithium aliphatic carboxylate. Further, salts in which other alkali metals are used can also be used.

A known organic solvent or ionic liquid can be used without particular limitation as the organic solvent or ionic liquid for dissolving an electrolyte. For example, ethylene carbonate (EC), propylene carbonate (PC), diethyl carbonate (DEC), methylethyl carbonate (MEC), and dimethyl carbonate (DMC) and the like can be used as the organic solvent. Further, with respect to the ionic liquid, as a constituting ion of the ionic liquid, N,N-bis(trifluoromethanesulfonyl)imide and fluorosulfonylimide and the like can be used as the anion, and 1-ethyl-3-methylimidazolium and N,N-dimethyl-N-ethyl-N-methoxyethylammonium and the like can be used as the cation. These electrolytic solutions may be used singly or in combination of two or more.

A metal outer packaging body, an aluminum-laminated outer packaging body, and the like can be suitably used as the outer packaging body. The shape of the battery may be any shape, including a coin type, a button type, a sheet type, a cylinder type, a square type, and a flat type. The battery of the present embodiment can be produced using a known production method.

EXAMPLES

Hereinafter, the present invention will be described in further detail with reference to Examples and Comparative Examples, but the present invention is not limited to these. Note that "part" and "%" in Examples and Comparative Examples represent "part by mass" and "% by mass", respectively, unless otherwise specified.

In the following Examples and Comparative Examples, LIGHT ESTER P-1M (trade name, Kyoeisha Chemical Co., Ltd.), Phosmer PE, Phosmer PP, Phosmer CL and Phosmer MH (trade names, Uni-Chemical Co., Ltd.) were used as (a) the phosphoric acid group-containing ethylenically unsaturated monomer represented by the general formula (1), and LIGHT ESTER P-2M was used as (a) the phosphoric acid group-containing ethylenically unsaturated monomer represented by the general formula (2).

The method for calculating the theoretical Tg of the binder and the method for measuring the non-volatile matter in the binder dispersion in Examples are as described above, but will be also described below. In addition, the tests for evaluating the physical properties and the performance of binders used in Examples and Comparative Examples and batteries obtained by using these binders were performed by the following methods.

(Non-Volatile Matter)

The non-volatile matter was calculated by weighing out about 1 g of a resin in an aluminum dish having a diameter of 5 cm, drying the resin at 105° C. for 1 hour and weighing the resulting residue.

(Viscosity)

As described above, the viscosity of the binder dispersion is measured by changing the measurement method depending on whether the viscosity is 500 mPa·s or more or less than 500 mPa·s. The measurement method for the viscosity of 500 mPa·s or more is first performed, and if the measurement result is less than 500 mPa·s, the measurement is performed by changing the measurement condition to the following condition. When the viscosity of the binder dispersion was 500 mPa·s or more, the viscosity was measured using a Brookfield type rotational viscometer with a No. 2 or a No. 3 rotor at a liquid temperature of 23° C. and a number of revolution of 10 rpm. On the other hand, when the viscosity of the binder dispersion was less than 500 mPa·s, the viscosity was measured using a Brookfield type rotational viscometer with a No. 2 rotor at a liquid temperature of 23° C. and a number of revolution of 60 rpm (for example, in the case of Comparative Example 4 and Example 2 as described below).

(Glass Transition Temperature (Tg))

The glass transition temperature was determined by the above-mentioned method for calculating the theoretical Tg.

Comparative Example 1

(Preparation of Binder for Nonaqueous Battery Electrodes A)

A separable flask equipped with a cooling tube, a thermometer, a stirrer and a dropping funnel was charged with 175.0 parts by mass of water and 2.5 parts by mass of 40% "ELEMINOL JS-20" (manufactured by Sanyo Chemical Industries, Ltd.; an anionic surfactant, sodium alkyl allyl sulfosuccinate; a compound having a structural formula of the above general formula (8), wherein M represent Na) as an anionic surfactant, and heated to a temperature of 75° C. Subsequently, a previously prepared emulsion of a surfactant, a monomer mixture and water, and a polymerization initiator were dropwise added to the separable flask with stirring at 80° C. over 3 hours to perform emulsion polymerization. A surfactant containing 10.0 parts by mass of 40% "ELEMINOL JS-20" (manufactured by Sanyo Chemical Industries, Ltd.; an anionic surfactant, sodium alkyl allyl sulfosuccinate) and 2.0 parts by mass of "HITENOL 08E" (manufactured by Dai-Ichi Kogyo Seiyaku Co., Ltd.; polyoxyethylene alkyl ether sulfuric ester salt) was used as the surfactant which was dropwise added to the separable flask. A monomer mixture containing 250.5 parts by mass of styrene (SM), 224.4 parts by mass of 2-ethylhexyl acrylate (2-EHA), 5.0 parts by mass of tert-butyl methacrylate (TMBA), 2.0 parts by mass of sodium p-styrenesulfonate (NASS), 12.0 parts by mass of acrylic acid (Aa), 10 parts by mass of itaconic acid (IA) and 10.0 parts by mass of 2-hydroxyethyl methacrylate (2-HEMA) was mixed with 250.0 parts by mass of water, which was emulsified and used as the monomer mixture. A polymerization initiator prepared by dissolving 2.0 parts by mass of potassium persulfate (KPS) in 50.0 parts by mass of water was used as the above-mentioned polymerization initiator. The emulsion polymerization was performed by dropwise adding the whole composition to the separable flask, aging it at 80° C. for 2 hours with stirring, cooling it and adding 37.5 parts by mass of 10% aqueous ammonia (NH$_3$) and 265.0 parts by mass of dilution water thereto to provide the binder for nonaqueous battery electrodes A containing the polymer a. The resulting polymer a had a Tg of −2° C., and the binder for nonaqueous battery electrodes A had a non-volatile matter of 40.0%, a viscosity of 1500 mPa·s and a pH of 7.3. The added amounts of each components are shown in Table 4, and the evaluation results are shown in Table 6. In Table 4, all of the amounts were expressed as parts by mass of the net.

Examples 1 to 15 and Comparative Examples 2 to 11

Binder compositions B to Z were prepared in the same manner as the binder for nonaqueous battery electrodes A except that the components were changed as shown in Table 4 or Table 5. The added amounts of each components are shown in Table 4 or 5, and the evaluation results are shown in Table 6.

Each component in the binder for nonaqueous battery electrodes is described below.

The following was used as (C) the neutralizing agent comprising an alkali metal compound and/or an alkaline earth metal compound.

NaOH: 10% aqueous sodium hydroxide solution

The following was used as (a) the phosphoric acid group-containing ethylenically unsaturated monomer and (b) phosphoric acid group-containing surfactant.

(a) Phosphoric Acid Group-Containing Ethylenically Unsaturated Monomer

TABLE 1

| | |
|---|---|
| LIGHT ESTER P-1M | $CH_2=C(CH_3)-C(=O)-O-CH_2CH_2-O-P(=O)(OH)-OH$ |

2-Methacryloyloxyethyl acid phosphate
Manufactured by Kyoeisha Chemical Co., Ltd.

| | |
|---|---|
| LIGHT ESTER P-2M | $CH_2=C(CH_3)-C(=O)-O-CH_2CH_2O-P(=O)(OH)-OCH_2CH_2-O-C(=O)-C(CH_3)=CH_2$ |

(Main component)
Bis(2-hydroxyethyl methacrylate) phosphate
Manufactured by Kyoeisha Chemical Co., Ltd.

| | |
|---|---|
| Phosmer PE | $H_2C=C(CH_3)-C(=O)-O-(CH_2-CH_2-O)_n-P(=O)(OH)-OH$ | n = 4~5

Acid phosphooxypolyoxyethylene glycol monomethacrylate
Manufactured by DAP Co., Ltd.

| | |
|---|---|
| Phosmer PP | $H_2C=C(CH_3)-C(=O)-O-(CH_2-CH(CH_3)-O)_n-P(=O)(OH)-OH$ | n = 5~6

Acid phosphooxypolyoxypropylene glycol monomethacrylate
Manufactured by DAP Co., Ltd.

| | |
|---|---|
| Phosmer CL | $H_2C=C(CH_3)-C(=O)-O-CH_2-CH(CH_2Cl)-O-P(=O)(OH)-OH$ |

3-Chloro-2-acid phosphooxypropyl methacrylate
Manufactured by DAP Co., Ltd.

| | |
|---|---|
| Phosmer MH | $(CH_2=C(CH_3)-C(=O)-O-CH_2-CH_2-O-P(=O)(OH)-O)^- \; ^+NH_3CH_2OH$ |

Methacryloyloxyethyl acid phosphate monoethanolamine half salt
Manufactured by DAP Co., Ltd.

(b) Phosphoric Acid Group-Containing Surfactant

TABLE 2

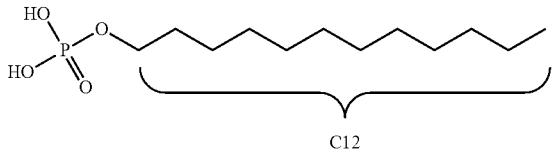

The above-mentioned HITENOL 08E has the following structure.

TABLE 3

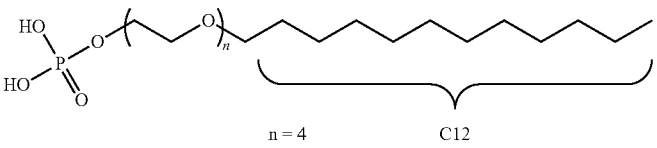

Comparative Example 12

One hundred parts by mass of graphite (manufactured by Showa Denko K.K., SCMG-BR) as an active material, 2 parts by mass of acetylene black as a conductive aid, and 1 part by mass of carboxymethyl cellulose-sodium salt (manufactured by Nippon Paper Chemicals Co., Ltd., product name SUNROSE MAC500LC) as a thickener were weighed, and thereto was added a small amount of water. The mixture was subjected to thick-kneading for 20 minutes at 60 revolutions per minute using a stirring mixer (planetary mixer). Next, the above binder for nonaqueous battery electrodes A was added to the kneaded mixture so that the non-volatile matter of the binder might be 1.5 parts, and thereto was added additional water so that the total amount of the previously added water and the additional water might be 104.5 parts by mass based on 105.0 parts by mass of the sum of the graphite, the carboxymethyl cellulose-sodium salt, and the binder dispersion. The resulting mixture was further mixed for 20 minutes at 60 revolutions per minute, thereby producing a slurry for a negative electrode.

The resulting slurry for a negative electrode was applied to one surface of copper foil having a thickness of 18 μm serving as a collector using a doctor blade so that the coating amount after drying might be 7 mg/cm$^2$, dried by heating at 60° C. for 10 minutes, and further dried at 120° C. for 10 minute, thus forming an active material layer. Subsequently, a negative electrode was obtained through a pressing step at a pressing pressure of 4 t/cm$^2$ using a mold press.

(Production of Lithium Ion Secondary Battery)

Next, a lithium ion secondary battery was produced as follows using the above negative electrode. A positive electrode produced in the following procedures was used as a positive electrode to be combined with the negative electrode. To a mixture of 90% by mass of LiCoO$_2$, 5% by mass of acetylene black as a conductive aid, and 5% by mass of polyvinylidene fluoride as a binder, was added 100% by mass of N-methylpyrrolidone followed by mixing to produce a slurry for a positive electrode. The resulting slurry for a positive electrode was applied to aluminum foil having a thickness of 20 μm serving as a collector by a doctor blade method so that the thickness after roll press treatment might be 100 μm and dried at 120° C. for 5 minutes. Subsequently, a positive electrode was obtained through a pressing step.

Further, an electrolytic solution to be used for a lithium ion secondary battery was prepared by dissolving LiPF$_6$ in a mixed solvent prepared by mixing ethylene carbonate (EC) with diethyl carbonate (EMC) at a volume ratio of 40:60 so that the concentration of LiPF$_6$ might be 1.0 mol/L.

A conductive tab was attached to each of the resulting positive electrode and negative electrode; a separator made of a polyolefin porous film was allowed to intervene between the positive electrode and the negative electrode; and they were received in an aluminum laminated outer packaging body (battery pack) so that the active material of the positive electrode and the active material of the negative electrode are opposite to each other. The electrolytic solution was injected into the outer packaging body, which was packed with a vacuum heat sealer to obtain a laminate type battery. The battery obtained in this way was measured for the charge-discharge cycle property. The evaluation results on the above negative electrode and lithium ion secondary battery are shown in Table 7.

Examples 16 to 30 and Comparative Examples 13 to 22

Negative electrodes and lithium ion secondary batteries were manufactured in the same manner as in Comparative Example 12 except that the binder for nonaqueous battery electrodes A was changed to the binders for nonaqueous battery electrodes B to Z, and the performance was evaluated. The results are shown in Table 7.

TABLE 4

| | | Components | | | | | | | | | | | |
|---|---|---|---|---|---|---|---|---|---|---|---|---|---|
| | | (A) Ethylenically unsaturated monomer | | | | | | | | | | | |
| Comparative | | Ethylenically unsaturated monomer having no phosphoric acid group | | | | | | | (a) Phosphoric acid group-containing unsaturated monomer | | | | |
| Example | Binder | SM | 2-EHA | TBMA | NASS | Aa | IA | 2-HEMA | P-1M | P-2M | PE | PP | CL |
| 1 | A | 250.5 | 224.4 | 5.0 | 2.0 | 12.0 | 10.0 | 10.0 | | | | | |
| 2 | B | 250.5 | 224.4 | 5.0 | 2.0 | 12.0 | 10.0 | 10.0 | | | | | |
| 3 | C | 242.8 | 213.2 | 5.0 | 2.0 | 12.0 | 10.0 | 10.0 | 25.0 | | | | |
| 4 | D | 242.8 | 213.2 | 5.0 | 2.0 | 12.0 | 10.0 | 10.0 | | 25.0 | | | |
| 5 | E | 242.8 | 213.2 | 5.0 | 2.0 | 12.0 | 10.0 | 10.0 | | | 25.0 | | |
| 6 | F | 242.8 | 213.2 | 5.0 | 2.0 | 12.0 | 10.0 | 10.0 | | | | 25.0 | |
| 7 | G | 242.8 | 213.2 | 5.0 | 2.0 | 12.0 | 10.0 | 10.0 | | | | | 25.0 |
| 8 | H | 242.8 | 213.2 | 5.0 | 2.0 | 12.0 | 10.0 | 10.0 | | | | | |
| 9 | I | 250.5 | 224.4 | 5.0 | 2.0 | 12.0 | 10.0 | 10.0 | | | | | |
| 10 | J | 250.5 | 224.4 | 5.0 | 2.0 | 12.0 | 10.0 | 10.0 | | | | | |
| 11 | K | 250.5 | 224.4 | 5.0 | 2.0 | 12.0 | 10.0 | 10.0 | | | | | |

| | Components | | | | | | | | |
|---|---|---|---|---|---|---|---|---|---|
| | (A) Ethylenically unsaturated monomer | | (B) Surfactant | | | | | (C) Neutralizing agent | |
| | (a) Phosphoric acid group-containing unsaturated monomer | | Surfactant having no phosphoric acid group | (b) Phosphoric acid group-containing surfactant | | | | Alkali metal | |
| Comparative Example | MH | (a)/(A) mol % | JS-20 | ML-08E | ML-200 | RD-510Y | AL | % by mass | NH$_3$ | compound NaOH | Dilution water |
| 1 | | | 5.0 | 2.0 | | | | | 3.75 | | 265.0 |
| 2 | | | 5.0 | 2.0 | | | | | | 7.94 | 223.1 |
| 3 | | 3.0 | 5.0 | 2.0 | | | | | 3.75 | | 265.0 |
| 4 | | 2.1 | 5.0 | 2.0 | | | | | 3.75 | | 265.0 |
| 5 | | 1.9 | 5.0 | 2.0 | | | | | 3.75 | | 265.0 |
| 6 | | 1.4 | 5.0 | 2.0 | | | | | 3.75 | | 265.0 |
| 7 | | 2.4 | 5.0 | 2.0 | | | | | 3.75 | | 265.0 |
| 8 | 25.0 | 2.3 | 5.0 | 2.0 | | | | | 3.75 | | 265.0 |
| 9 | | | 5.0 | | 2.0 | | | 28.6 | 3.75 | | 265.0 |
| 10 | | | 5.0 | | | 2.0 | | 28.6 | 3.75 | | 265.0 |
| 11 | | | 5.0 | | | | 2.0 | 28.6 | 3.75 | | 265.0 |

TABLE 5

| | | Components | | | | | | | | | | | |
|---|---|---|---|---|---|---|---|---|---|---|---|---|---|
| | | (A) Ethylenically unsaturated monomer | | | | | | | | | | | |
| | | Ethylenically unsaturated monomer having no phosphoric acid group | | | | | | | (a) Phosphoric acid group-containing unsaturated monomer | | | | |
| Example | Binder | SM | 2-EHA | TBMA | NASS | Aa | IA | 2-HEMA | P-1M | P-2M | PE | PP | CL |
| 1 | L | 242.8 | 213.2 | 5.0 | 2.0 | 12.0 | 10.0 | 10.0 | 25.0 | | | | |
| 2 | M | 242.8 | 213.2 | 5.0 | 2.0 | 12.0 | 10.0 | 10.0 | | 25.0 | | | |

TABLE 5-continued

| | | | | | | | | | | | | |
|---|---|---|---|---|---|---|---|---|---|---|---|---|
| 3 | N | 242.8 | 213.2 | 5.0 | 2.0 | 12.0 | 10.0 | 10.0 | | 25.0 | | |
| 4 | O | 242.8 | 213.2 | 5.0 | 2.0 | 12.0 | 10.0 | 10.0 | | | 25.0 | |
| 5 | P | 242.8 | 213.2 | 5.0 | 2.0 | 12.0 | 10.0 | 10.0 | | | | 25.0 |
| 6 | Q | 242.8 | 213.2 | 5.0 | 2.0 | 12.0 | 10.0 | 10.0 | | | | |
| 7 | R | 250.5 | 224.4 | 5.0 | 2.0 | 12.0 | 10.0 | 10.0 | | | | |
| 8 | S | 250.5 | 224.4 | 5.0 | 2.0 | 12.0 | 10.0 | 10.0 | | | | |
| 9 | T | 250.5 | 224.4 | 5.0 | 2.0 | 12.0 | 10.0 | 10.0 | | | | |
| 10 | U | 242.8 | 213.2 | 5.0 | 2.0 | 12.0 | 10.0 | 10.0 | 25.0 | | | |
| 11 | V | 242.8 | 213.2 | 5.0 | 2.0 | 12.0 | 10.0 | 10.0 | | 25.0 | | |
| 12 | W | 242.8 | 213.2 | 5.0 | 2.0 | 12.0 | 10.0 | 10.0 | | | 25.0 | |
| 13 | X | 242.8 | 224.4 | 5.0 | 2.0 | 12.0 | 10.0 | 10.0 | 25.0 | | | |
| 14 | Y | 242.8 | 224.4 | 5.0 | 2.0 | 12.0 | 10.0 | 10.0 | | 25.0 | | |
| 15 | Z | 242.8 | 224.4 | 5.0 | 2.0 | 12.0 | 10.0 | 10.0 | | | 25.0 | |

| | Components | | | | | | | | | |
|---|---|---|---|---|---|---|---|---|---|---|
| | (A) Ethylenically unsaturated monomer | | (B) Surfactant | | | | | | (C) Neutralizing agent | |
| | (a) Phosphoric acid group-containing unsaturated monomer | | Surfactant having no phosphoric acid group | (b) Phosphoric acid group-containing surfactant | | | | | Alkali metal | |
| Example | MH | (a)/(A) mol % | JS-20 | 08E | ML-200 | RD-510Y | AL | (b)/(B) % by mass | $NH_3$ | compound NaOH | Dilution water |
| 1 | | 3.0 | 5.0 | 2.0 | | | | | | 7.94 | 223.1 |
| 2 | | 2.1 | 5.0 | 2.0 | | | | | | 7.94 | 223.1 |
| 3 | | 1.9 | 5.0 | 2.0 | | | | | | 7.94 | 223.1 |
| 4 | | 1.4 | 5.0 | 2.0 | | | | | | 7.94 | 223.1 |
| 5 | | 2.4 | 5.0 | 2.0 | | | | | | 7.94 | 223.1 |
| 6 | 25.0 | 2.3 | 5.0 | 2.0 | | | | | | 7.94 | 223.1 |
| 7 | | | 5.0 | | 2.0 | | | 28.6 | | 7.94 | 223.1 |
| 8 | | | 5.0 | | | 2.0 | | 28.6 | | 7.94 | 223.1 |
| 9 | | | 5.0 | | | | 2.0 | 28.6 | | 7.94 | 223.1 |
| 10 | | 3.0 | 5.0 | | | | 2.0 | 28.6 | 3.75 | | 265.0 |
| 11 | | 2.1 | 5.0 | | | | 2.0 | 28.6 | 3.75 | | 265.0 |
| 12 | | 1.9 | 5.0 | | | | 2.0 | 28.6 | 3.75 | | 265.0 |
| 13 | | 3.0 | 5.0 | | | | 2.0 | 28.6 | | 7.94 | 223.1 |
| 14 | | 2.1 | 5.0 | | | | 2.0 | 28.6 | | 7.94 | 223.1 |
| 15 | | 1.9 | 5.0 | | | | 2.0 | 28.6 | | 7.94 | 223.1 |

TABLE 6

| | | Component ratio and property of the resulting polymer | | | | | | Evaluation Properties of binder | | |
|---|---|---|---|---|---|---|---|---|---|---|
| | Binder | Phosphorus atoms derived from (a) and (b) (parts by mass) | Tg of polymer in binder (° C.) | Ethylenically unsaturated monomer having no phosphoric acid group in (A) component (mol %) | (b)/(A) (% by mass) | (B)/(A) (% by mass) | (C)/(A) (% by mass) | Non-volatile matter (%) | Viscosity (mPa · s) | pH |
| Comparative Example 1 | A | 0.00 | −2 | 100.0 | 0 | 1.4 | 0.7 | 40.0 | 1500 | 7.3 |
| Comparative Example 2 | B | 0.00 | −2 | 100.0 | 0 | 1.4 | 1.5 | 40.0 | 1200 | 7.0 |
| Comparative Example 3 | C | 0.70 | −2 | 97.0 | 0 | 1.4 | 0.7 | 40.1 | 2200 | 6.6 |
| Comparative Example 4 | D | 0.46 | −2 | 97.9 | 0 | 1.4 | 0.7 | 39.9 | 400 | 7.2 |
| Comparative Example 5 | E | 0.41 | −2 | 98.1 | 0 | 1.4 | 0.7 | 40.0 | 4000 | 6.5 |
| Comparative Example 6 | F | 0.32 | −2 | 98.6 | 0 | 1.4 | 0.7 | 40.0 | 600 | 7.3 |
| Comparative Example 7 | G | 0.57 | −2 | 97.6 | 0 | 1.4 | 0.7 | 40.2 | 2400 | 6.4 |
| Comparative Example 8 | H | 0.54 | −2 | 97.7 | 0 | 1.4 | 0.7 | 40.0 | 3000 | 6.7 |
| Comparative Example 9 | I | 0.04 | −2 | 100.0 | 0.4 | 1.4 | 0.7 | 40.0 | 1400 | 7.1 |
| Comparative Example 10 | J | 0.03 | −2 | 100.0 | 0.4 | 1.4 | 0.7 | 40.3 | 1300 | 7.2 |
| Comparative Example 11 | K | 0.02 | −2 | 100.0 | 0.4 | 1.4 | 0.7 | 40.0 | 1500 | 7.1 |

TABLE 6-continued

| | Binder | Component ratio and property of the resulting polymer | | | | | | Evaluation Properties of binder | | |
| | | Phosphorus atoms derived from (a) and (b) (parts by mass) | Tg of polymer in binder (° C.) | Ethylenically unsaturated monomer having no phosphoric acid group in (A) component (mol %) | (b)/(A) (% by mass) | (B)/(A) (% by mass) | (C)/(A) (% by mass) | Non-volatile matter (%) | Viscosity (mPa·s) | pH |
|---|---|---|---|---|---|---|---|---|---|---|
| Example 1 | L | 0.70 | −2 | 97.0 | 0 | 1.4 | 1.5 | 40.2 | 800 | 6.4 |
| Example 2 | M | 0.46 | −2 | 97.9 | 0 | 1.4 | 1.5 | 39.8 | 300 | 7.0 |
| Example 3 | N | 0.41 | −2 | 98.1 | 0 | 1.4 | 1.5 | 40.0 | 3400 | 7.2 |
| Example 4 | O | 0.32 | −2 | 98.6 | 0 | 1.4 | 1.5 | 40.0 | 500 | 6.2 |
| Example 5 | P | 0.57 | −2 | 97.6 | 0 | 1.4 | 1.5 | 40.1 | 2200 | 6.4 |
| Example 6 | Q | 0.54 | −2 | 97.7 | 0 | 1.4 | 1.5 | 40.1 | 2000 | 6.6 |
| Example 7 | R | 0.04 | −2 | 100.0 | 0.4 | 1.4 | 1.5 | 39.8 | 1100 | 6.9 |
| Example 8 | S | 0.03 | −2 | 100.0 | 0.4 | 1.4 | 1.5 | 39.9 | 1100 | 6.9 |
| Example 9 | T | 0.02 | −2 | 100.0 | 0.4 | 1.4 | 1.5 | 39.9 | 1300 | 7.0 |
| Example 10 | U | 0.72 | −2 | 97.0 | 0.4 | 1.4 | 0.7 | 40.0 | 1400 | 6.6 |
| Example 11 | V | 0.48 | −2 | 97.9 | 0.4 | 1.4 | 0.7 | 40.2 | 700 | 7.1 |
| Example 12 | W | 0.43 | −2 | 98.1 | 0.4 | 1.4 | 0.7 | 40.3 | 4500 | 6.6 |
| Example 13 | X | 0.71 | −2 | 97.0 | 0.4 | 1.3 | 1.5 | 39.8 | 1300 | 6.4 |
| Example 14 | Y | 0.47 | −2 | 97.9 | 0.4 | 1.3 | 1.5 | 40.0 | 600 | 6.8 |
| Example 15 | Z | 0.42 | −2 | 98.1 | 0.4 | 1.3 | 1.5 | 40.0 | 3900 | 6.5 |

TABLE 7

| | Binder | Evaluation Battery Charge-discharge cycle property (%) |
|---|---|---|
| Comparative Example 12 | A | 78.9 |
| Comparative Example 13 | B | 80.4 |
| Comparative Example 14 | C | 82.9 |
| Comparative Example 15 | D | 79.5 |
| Comparative Example 16 | E | 82.3 |
| Comparative Example 17 | F | 81.5 |
| Comparative Example 18 | G | 82.1 |
| Comparative Example 19 | H | 82.2 |
| Comparative Example 20 | I | 79.5 |
| Comparative Example 21 | J | 80.5 |
| Comparative Example 22 | K | 80.8 |
| Example 16 | L | 86.0 |
| Example 17 | M | 85.8 |
| Example 18 | N | 85.0 |
| Example 19 | O | 83.0 |
| Example 20 | P | 83.7 |
| Example 21 | Q | 84.9 |
| Example 22 | R | 83.0 |
| Example 23 | S | 83.0 |
| Example 24 | T | 83.2 |
| Example 25 | U | 83.5 |
| Example 26 | V | 83.3 |
| Example 27 | W | 83.7 |
| Example 28 | X | 87.1 |
| Example 29 | Y | 86.0 |
| Example 30 | Z | 87.0 |

INDUSTRIAL APPLICABILITY

Since the binder composition for nonaqueous battery electrodes of the present invention exhibits an excellent cycle property in the charge and discharge cycle test at 100 cycles, it is suitable not only as a power source for notebook personal computers, mobile telephones, electric power tools and electronic communications equipment, but also as a power source for electric vehicles, hybrid electric vehicles and the like.

The invention claimed is:

1. A binder composition for nonaqueous battery electrodes, the composition comprising (A) an ethylenically unsaturated monomer and (B) a surfactant, and further satisfying the following conditions (I) and (II):

(I) (A) the ethylenically unsaturated monomer comprises (a) a phosphoric acid group-containing ethylenically unsaturated monomer; and (II) (B) the surfactant comprises (b) a phosphoric acid group-containing surfactant, wherein the total amount in the composition of phosphorus atoms derived from (a) the phosphoric acid group-containing ethylenically unsaturated monomer and (b) the phosphoric acid group-containing surfactant is 0.01 to 3.0 parts by mass based on 100 parts by mass of the total amount of (A) the ethylenically unsaturated monomer and (B) the surfactant.

2. The binder composition for nonaqueous battery electrodes according to claim 1, wherein (a) the phosphoric acid group-containing ethylenically unsaturated monomer at least comprises a compound represented by the following general formula (1) or (2):

[Formula 1]

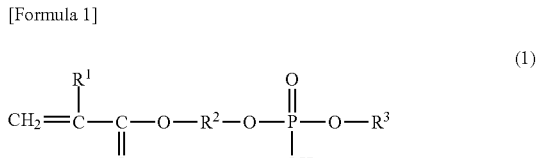

(1)

wherein $R^1$ represents a hydrogen atom or a methyl group; $R^2$ represents a divalent aliphatic hydrocarbon group having from 1 to 30 carbon atoms which may have a halogen group or an ether group; and $R^3$ represents a hydrogen atom or an aliphatic hydrocarbon group having from 1 to 10 carbon atoms or an aromatic hydrocarbon group; or $R^3$ represents a cation selected from the group consisting of ammonium, sodium, lithium, potassium and alcohol amino half salt; or

[Formula 2]

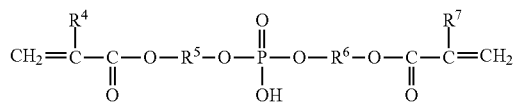
(2)

wherein $R^4$ and $R^7$ each independently represent a hydrogen atom or a methyl group; and $R^5$ and $R^6$ each independently represent a divalent aliphatic hydrocarbon group having from 1 to 30 carbon atoms.

3. The binder composition for nonaqueous battery electrodes according to claim 1, wherein the amount of (a) the phosphoric acid group-containing ethylenically unsaturated monomer is from 0.03 to 15 mol % based on the total amount of (A) the ethylenically unsaturated monomer in the binder composition for nonaqueous battery electrodes.

4. The binder composition for nonaqueous battery electrodes according to claim 1, wherein (b) the phosphoric acid group-containing surfactant at least comprises a compound represented by the following general formula (3):

[Formula 3]

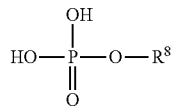
(3)

wherein $R^8$ represents an aliphatic hydrocarbon group having from 6 to 18 carbon atoms or a group represented by the following formula (4):

[Formula 4]

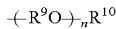
(4)

wherein $R^9$ represents a divalent aliphatic hydrocarbon group having 2 or 3 carbon atoms; $R^{10}$ represents an aliphatic hydrocarbon group having from 6 to 18 carbon atoms or a group represented by the following formula (5); and n is an integer of from 1 to 10:

[Formula 5]

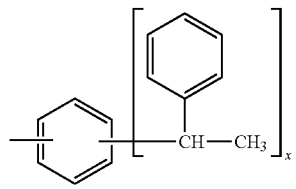
(5)

wherein x is an integer of from 1 to 5.

5. The binder composition for nonaqueous battery electrodes according to claim 1, wherein the amount of (b) the phosphoric acid group-containing surfactant is from 1.0 to 60% by mass based on the total amount of (B) the surfactant in the binder composition for nonaqueous battery electrodes.

6. The binder composition for nonaqueous battery electrodes according to claim 1, further comprising (C) at least one neutralizing agent selected from the group consisting of an alkaline metal compound and an alkali earth metal compound.

7. The binder composition for nonaqueous battery electrodes according to claim 6, wherein the amount of (C) the alkali metal salt and/or the alkali earth metal salt is from 0.1 to 5 parts by mass based on 100 parts by mass of the total amount of the ethylenically unsaturated monomer in the binder composition for nonaqueous battery electrodes.

8. A binder composition for nonaqueous battery electrodes, the composition comprising (A) an ethylenically unsaturated monomer and (B) a surfactant, and further satisfying the following conditions (I) and (II):
   (I) (A) the ethylenically unsaturated compound comprises
      (a) a phosphoric acid group-containing ethylenically unsaturated monomer; and
   (II) (B) the surfactant comprises (b) a phosphoric acid group-containing surfactant,
      wherein the amount of (a) the phosphoric acid group-containing ethylenically unsaturated monomer is from 0.03 to 15 mol % based on the total amount of (A) the ethylenically unsaturated monomer in the binder composition for nonaqueous battery electrodes.

9. The binder composition for nonaqueous battery electrodes according to claim 8, further comprising (C) at least one neutralizing agent selected from the group consisting of an alkaline metal compound and an alkali earth metal compound.

10. The binder composition for nonaqueous battery electrodes according to claim 9, wherein the amount of (C) the alkali metal salt and/or the alkali earth metal salt is from 0.1 to 5 parts by mass based on 100 parts by mass of the total amount of the ethylenically unsaturated monomer in the binder composition for nonaqueous battery electrodes.

11. A binder composition for nonaqueous battery electrodes, the composition comprising (A) an ethylenically unsaturated monomer and (B) a surfactant, and further satisfying the following conditions (I) and (II):
   (I) (A) the ethylenically unsaturated compound comprises
      (a) a phosphoric acid group-containing ethylenically unsaturated monomer; and
   (II) (B) the surfactant comprises (b) a phosphoric acid group-containing surfactant,
      wherein the amount of (b) the phosphoric acid group-containing surfactant is from 1.0 to 60% by mass based on the total amount of (B) the surfactant in the binder composition for nonaqueous battery electrodes.

12. The binder composition for nonaqueous battery electrodes according to claim 11, further comprising (C) at least one neutralizing agent selected from the group consisting of an alkaline metal compound and an alkali earth metal compound.

13. The binder composition for nonaqueous battery electrodes according to claim 12, wherein the amount of (C) the alkali metal salt and/or the alkali earth metal salt is from 0.1 to 5 parts by mass based on 100 parts by mass of the total amount of the ethylenically unsaturated monomer in the binder composition for nonaqueous battery electrodes.

* * * * *